J. P. BROWNLEE.
WAGON BODY.
APPLICATION FILED FEB. 4, 1914.
1,121,973.
Patented Dec. 22, 1914.
2 SHEETS—SHEET 1.
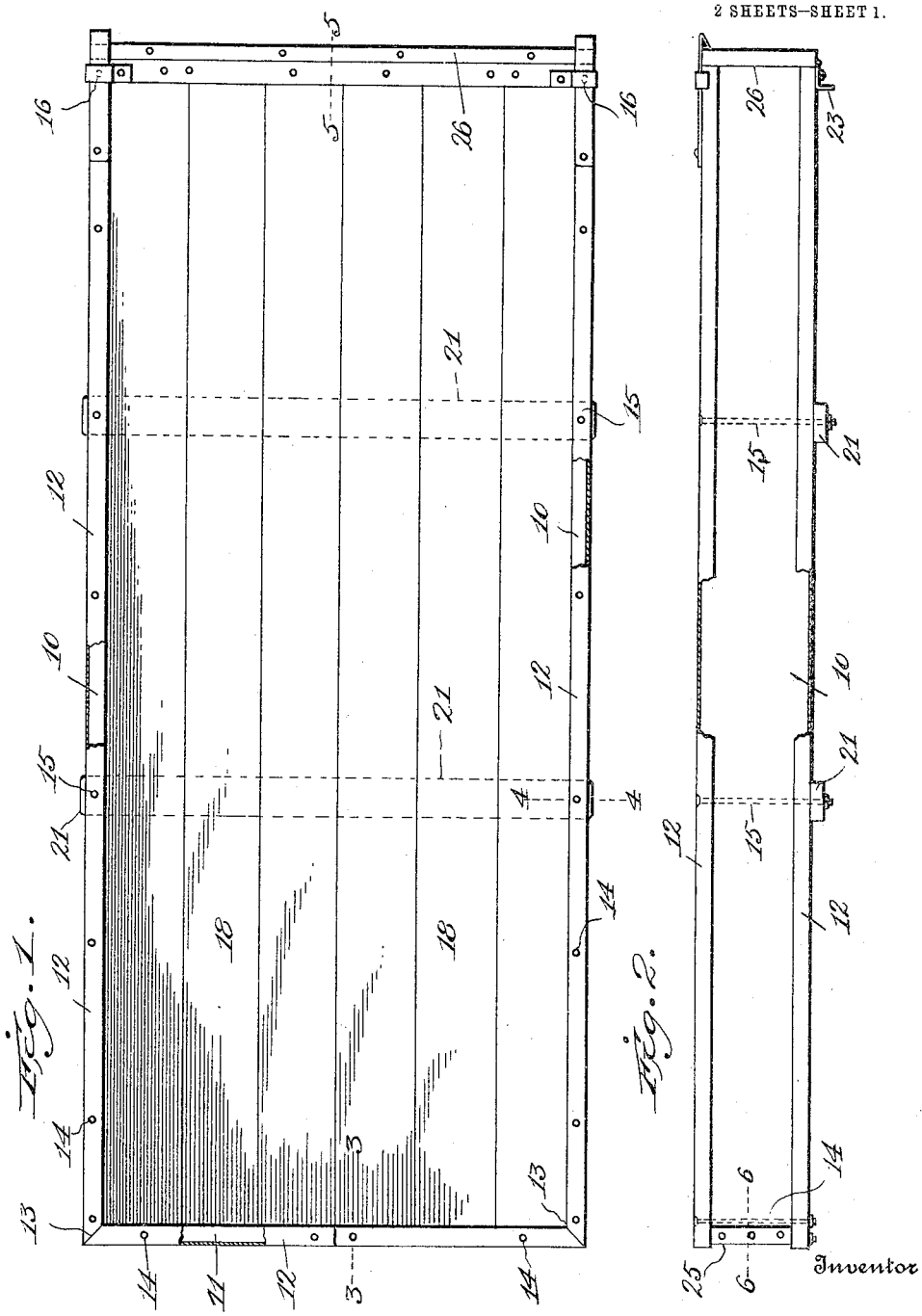

J. P. BROWNLEE.
WAGON BODY.
APPLICATION FILED FEB. 4, 1914.
1,121,973.
Patented Dec. 22, 1914.
2 SHEETS—SHEET 2.
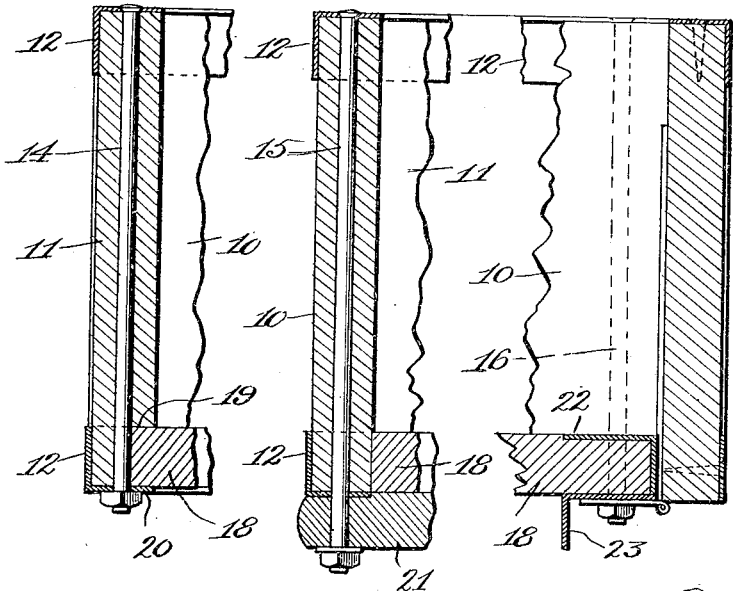
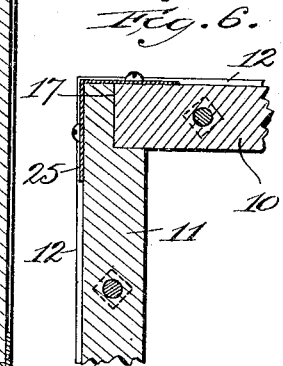
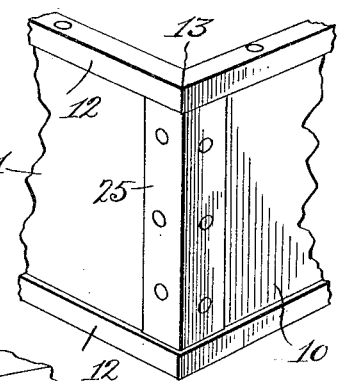
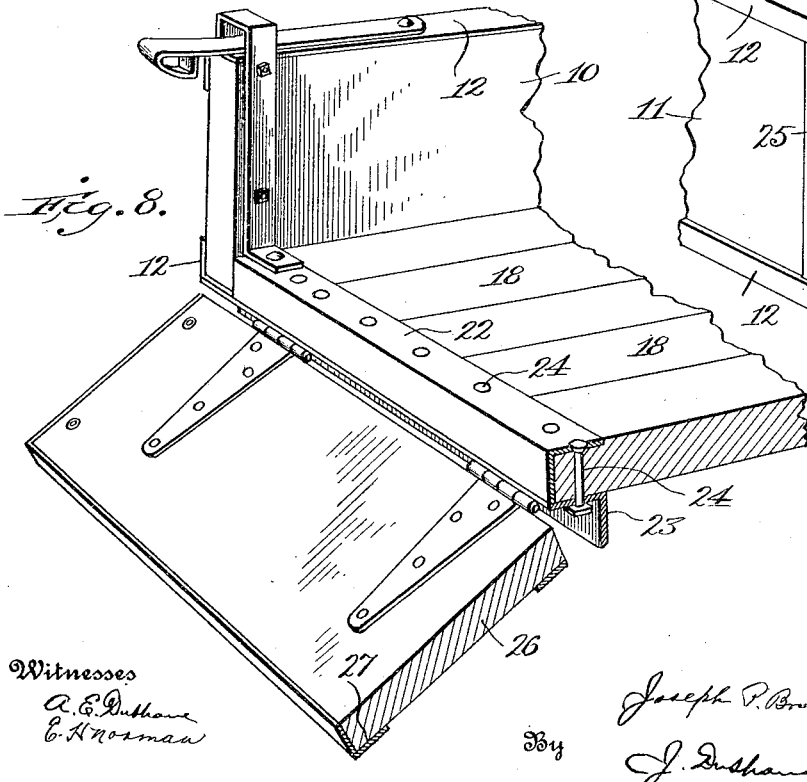

UNITED STATES PATENT OFFICE.

JOSEPH P. BROWNLEE, OF SOUTH BEND, INDIANA, ASSIGNOR TO THE STUDEBAKER CORPORATION, OF SOUTH BEND, INDIANA, A CORPORATION OF NEW JERSEY.

WAGON-BODY.

1,121,973.  Specification of Letters Patent.   Patented Dec. 22, 1914.

Application filed February 4, 1914. Serial No. 816,453.

*To all whom it may concern:*

Be it known that I, JOSEPH P. BROWNLEE, citizen of the United States, residing at South Bend, in the county of St. Joseph and State of Indiana, have invented certain new and useful Improvements in Wagon-Bodies, of which the following is a specification.

This invention relates to improvements in wagon bodies, and it has for its object to provide a construction that will be cheap to manufacture and of great durability, and is designed especially to avoid the use of top-rails, moldings and separate sills which are now incorporated in most of the bodies built of this type.

Another particular object is to construct in a manner to prevent warping of the different elements.

These and other objects hereinafter set forth, are attained by the means illustrated in the accompanying drawings, in which:—

Figure 1 is a plan view of the improved construction. Fig. 2 is a side elevation thereof. Fig. 3 is a detail vertical sectional view on the line 3—3 of Fig. 1. Fig. 4 is a like section on the line 4—4 of Fig. 1. Fig. 5 is a like section on the line 5—5 of Fig. 1. Fig. 6 is a horizontal sectional view on the line 6—6 of Fig. 2. Fig. 7 is a detail perspective view of one of the front corners of the body, and Fig. 8 is a detail perspective view of a portion of the rear end of the body together with the tail-gate.

Similar reference numerals in all of the figures of the drawings designate like parts.

The sides 10 and the front end wall 11 of the body are preferably formed with single pieces of material and are bound together with the angular metal bands 12 which embrace the outside upper and lower edges of said sides and end. The bands 12 extend continuously from the center of the front end wall, around the front corners and rearwardly to the tail-gate ends of the sides, and at the front corners the horizontal portion of the bands which cover the top and bottom surfaces of the walls are preferably mitered, as shown at 13, to form an even unobstructed surface. This leaves the vertical portions of the bands integral at the corners, binding the sides and ends closely and compactly together.

The bands 12 are secured to the walls by the bolts 14, 15, and 16, all of which extend centrally and vertically through the walls and are secured rigidly in place by suitable nuts screwed on their lower ends.

Side walls 10 are preferably rabbeted in the wall 11 as shown at 17 in Fig. 6, and the lower edge of said wall 11 is also rabbeted to receive the ends of the floor-planks 18, as at 19 in Fig. 3, said ends of the floor-planks being supported and clamped to the wall 11 by the lower edge band 12 of the body, as at 20, Fig. 3.

The floor-planks 18 are supported intermediate their ends by the cross pieces 21, which are sustained in position by the bolts 15 whose lower ends extend through the bottom bands 12 and the ends of said cross-pieces.

Planks 18 at their rear ends are connected together by the angle-irons 22 and 23, the iron 22 having a vertical and a horizontal wall which covers the vertical ends and a portion of the upper surfaces of said planks, and the iron 23 also having a horizontal and a vertical wall, its horizontal wall covering a portion of the under surfaces of the planks 18 and whose vertical wall projects downwardly back from the extreme ends of the planks. The irons 22 and 23 are secured in position by the bolts 24, and the irons 23 are extended at their ends to underlie the side walls 10 and are secured thereto by the bolts 16 which extend through said side walls and the horizontal portion of said extended ends of the irons 23. Thus it will be seen that the rear ends of the planks 18 are secured in position and supported in a pocket formed by the irons 22 and 23 and are entirely incased in said irons in a manner wherein the vertical walls of said irons resist any tendency of the planks 18 to warp out of alinement.

It will be observed that the bottom planks are loosely and mainly supported between the side walls upon the cross-piece 21, with their front ends resting in the rabbet of the front wall and upon a portion of the lower member 12 thereon, and their rear ends are supported by the iron 23 which is secured to the side walls by the bolts 16. Thus the bottom planks are freely retained in position excepting for the rear support 23 to which they are connected by the bolts 24, therefore, by removing the nuts from the two bolts 16 the bottom can be bodily removed for repairs without disturbing the balance of the body.

At the front corners of the body are secured the angle-irons 25 which inclose and protect the joining portions of the sides 10 and the end 11.

A tail-gate 26 is hinged to the body in the usual manner and is preferably formed of one piece of material having metal reinforcements around its edges, the same being angular as shown clearly at 27 in Fig. 8. The usual fastening means is attached to the rear end of the body for retaining the tail-gate in a closed position.

As thus constructed, a wagon body is provided which is formed in a simple manner with a very few separate portions preferably of suitable wood, and as all corners, ends, and edges are bound with metal which presents always a vertical portion to resist torsion and warping, a most compact and rigid construction is secured.

It is obvious that various patterns of angle or channel irons could be substituted for those shown without departing from the spirit of the invention, the main feature being to reinforce the parts of the body with comparatively light metal members which presents, one portion at least, edgewise to the plane surfaces of said parts.

Having thus fully described the invention, what is claimed is:—

1. A wagon body, comprising side-walls and an end wall, relatively light angular metal members closely engaging and embracing the bottom and top edges of said walls and extending continuously around the corners formed by their vertical meeting edges to bind said walls together in angular relation, through bolts extending vertically through said walls and engaging both the top and bottom metal members to secure them to the walls, cross pieces connecting the side-walls and secured to the underside of said walls by said through bolts, and a bottom fitting between the side walls and supported by said cross-pieces.

2. A wagon body, comprising side-walls and an end wall, relatively light angular metal members closely engaging and embracing the bottom and top edges of said walls and extending continuously around the corners formed by their vertical meeting edges to bind said walls together in angular relation, through bolts extending vertically through said walls and engaging both the top and bottom metal members to secure them to the walls, cross pieces connecting the side-walls and secured to the underside of said walls by said through bolts, and a bottom fitting between the side walls and supported by said cross-pieces, said front wall being rabbeted along its inner lower edge to form a pocket for the reception and support of the front ends of said bottom and to prevent them from warping.

3. A wagon body, comprising side-walls and an end wall, relatively light angular metal members closely engaging and embracing the bottom and top edges of said walls and extending continuously around the corners formed by their vertical meeting edges to bind said walls together in angular relation, through bolts extending vertically through said walls and engaging both the top and bottom metal members to secure them to the walls, cross pieces connecting the side-walls and secured to the underside of said walls by said through bolts, and a bottom fitting between the side walls and supported by said cross-pieces, said front wall being rabbeted along its inner lower edge to form a pocket for the reception and support of the front ends of said bottom and to prevent them from warping, and means secured directly to the undersides of said side-walls by two of said bolts which retain the metal members of the side-walls in place, for supporting and retaining the bottom in place between the side-walls, and to protect and prevent the rear ends of the bottom from warping.

In testimony whereof I affix my signature in presence of two witnesses.

JOSEPH P. BROWNLEE.

Witnesses:
ADOLPH COLBERG,
ROBERT C. PORTER.

Copies of this patent may be obtained for five cents each, by addressing the "Commissioner of Patents, Washington, D. C."